Jan. 15, 1963  G. S. EDWARDS ET AL  3,073,066
COMPOSITE BUILDING MATERIAL
Filed Nov. 13, 1959  2 Sheets-Sheet 1

INVENTORS
GEORGE S. EDWARDS
FREDERICK E. HOFFLER
BY
ATTORNEY

Jan. 15, 1963   G. S. EDWARDS ET AL   3,073,066
COMPOSITE BUILDING MATERIAL
Filed Nov. 13, 1959   2 Sheets-Sheet 2

INVENTORS
GEORGE S. EDWARDS
FREDERICK E. HOFFLER
BY
ATTORNEY

United States Patent Office 3,073,066
Patented Jan. 15, 1963

3,073,066
COMPOSITE BUILDING MATERIAL
George S. Edwards, Hillsborough, and Frederick E. Hoffler, Nevada City, Calif., assignors to E. H. Edwards Co., San Francisco, Calif., a corporation of California
Filed Nov. 13, 1959, Ser. No. 852,771
7 Claims. (Cl. 50—83)

This invention relates to an improved composite construction material useful as a backing and reinforcing means for stucco and plaster walls.

It overcomes the long-standing, complicated and costly problem of building walls from exterior cement plaster, more commonly known as stucco. Our invention provides, in a simple unitary composite structure, the three necessary components for a stucco wall base; the backing paper, the supporting line wires, and the reinforcing wire mesh. It eliminates the time-consuming steps heretofore required of having first to install horizontal reinforcing wires at evenly spaced intervals on the studs, of having to lay the backing paper over the wires and to secure the paper to the studding, and of further having to cut a separate piece of reinforcing mesh to proper size to fit over the backing paper.

A review of the prior art indicates that many attempts were made to eliminate the aforementioned step-by-step procedure by providing a composite building material for stucco wall construction but, significantly, all failed to gain acceptance in the building industry. These structures proved to be excessively complex, expensive to manufacture, and difficult to handle and install. This burdensome complexity arose from the fact that these structures failed to find a practical solution to the problem of binding together the backing paper, line wires, and wire mesh, and they relied instead on a large number of components such as inter-woven lacing wires, clips, staples, or reinforcing bars to hold together the essential components. An example of such a structure may be seen in the patent to Southwell (1,641,872).

Another serious problem arose in connection with the complex structures heretofore used where holes, slits, or perforations through the backing paper were necessary to bind the many components of the construction material together. These holes destroyed the essential waterproof integrity of the backing paper and allowed moisture to penetrate and damage the inner wall structure.

Aside from the time-consuming aspects of the step-by-step method of stucco wall construction, one serious problem was the need to maintain a firm, rigid plastering surface. Without a properly supported backing paper to provide a firm surface, the paper tended to sag and then required an additional amount of stucco, which was added in order to maintain a smooth exterior surface. Using the standard procedure as heretofore commonly employed in practice, the line wires were attached to the studding initially before applying the building paper. Often after the line wires had been attached some sagging occurred and to eliminate this defect it was necessary to tighten them. This tightening usually resulted in the application of unbalanced stresses causing serious deflection and misalignment of the stud frame members.

It is therefore the principal object of our invention to provide, in a simple unitary form, a composite material for constructing stucco walls. The present invention provides, as a combined unit, not only a strong, rigid plastering surface but also the necessary means to retain and reinforce the stucco material during its application and after it has set.

Another object of our invention is to provide a unitary composite material for stucco walls which eliminates the old step-by-step installation procedure and can be easily installed with a minimum of labor.

Another important object of this invention is to provide a stucco wall construction material that combines a reinforced backing material with wire mesh means and is sufficiently flexible so that it may be handled or stored in large quantities in a convenient roll form.

More specifically, the object of this invention is to provide a unitary composite reinforced lath material comprising a layer of backing paper removably attached to a layer of reinforcing mesh so that after the backing paper has been attached to the studding, the reinforcing mesh, while being retained in the proper position, may be easily separated by the workman and adjusted outwardly from the backing paper before being permanently attached by furring nails to the studding at a predetermined spacing from the backing paper.

Another object is to provide a composite reinforced lath material having both backing paper and wire mesh to support and grip the stucco and which does not have any perforations through the waterproof backing paper through which moisture can pass to the inner wall.

Still another object of the present invention is to provide a composite backing material which allows no sagging of the supporting line wires between the studs and requires no additional tightening after installation to maintain a firm plastering surface.

The invention possesses other objects and advantages, some of which, with the foregoing, will be set forth in the following description of the preferred form of the invention which is illustrated in the drawings accompanying and forming a part of the specification.

In the drawings:

FIG. 1 is a fragmentary view in perspective of a section of wall studding covered with the composite construction material embodying the principles of the present invention. The material is shown as it appears with the reinforcing mesh held in place by the removable tear strips. Parts are successively broken away to show the parts underneath.

Figure 1:
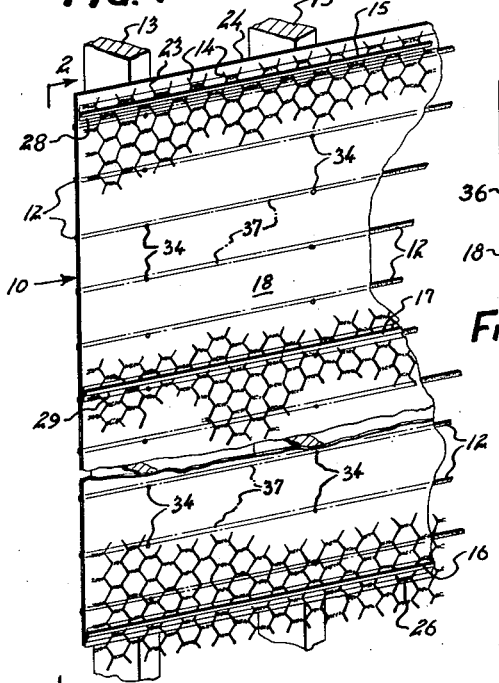
FIG. 1A is a fragmentary view in elevation of the form backing paper using bonded line wires for reinforcement.
Figure 6:
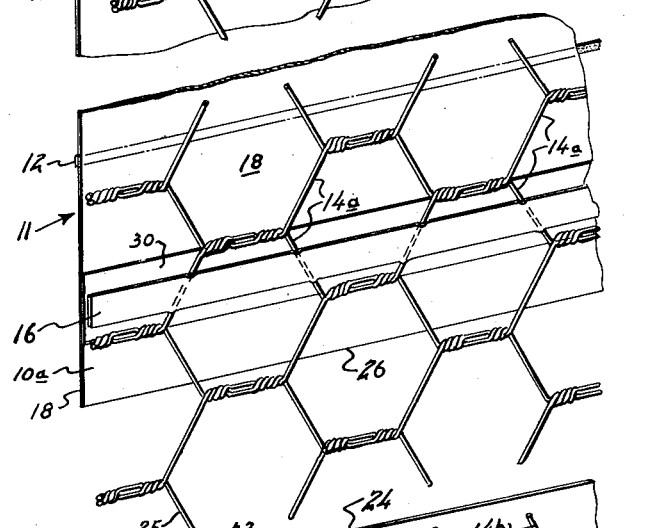

FIG. 6 by enlarged fragmentary views in perspective, shows in greater detail the arrangement of the tear tapes of FIG. 1. The upper view shows a portion of the lower edge of the composite material and the lower view shows a portion of the upper edge.

Figures 7, 8:
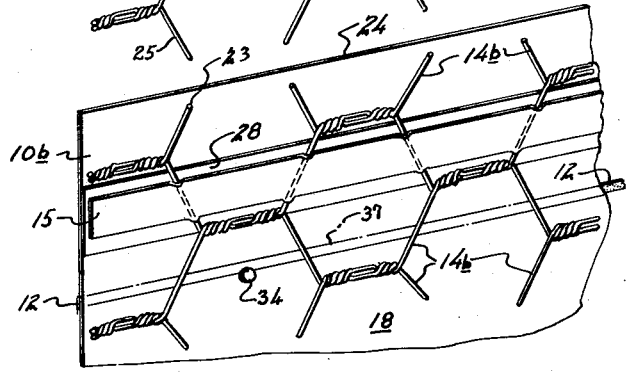

FIG. 7 is an enlarged view in section of a modified form of the backing paper alone with the flat wires secured to the building paper with strips of tape.

FIG. 8 is an enlarged view in section of another alternate form of backing paper using wire of circular cross-section and a full sheet of backing liner.

Figure 3:
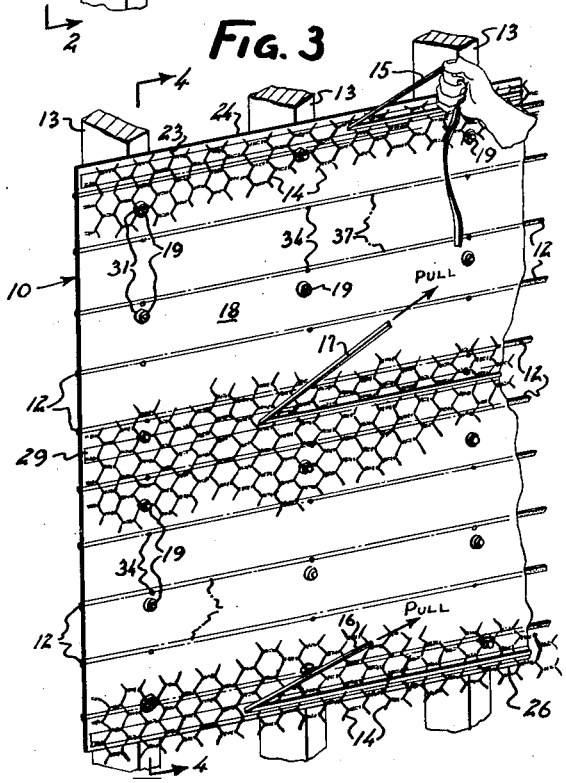
FIG. 3 is a fragmentary view in perspective of the wall section shown in FIG. 1 with the tear strips partially removed and the reinforcing mesh secured in the position away from the building paper by furring nails.

The present invention reduces to a few simple steps the installation of a rigidly supported prefabricated lath construction material used to support stucco walls. Broadly considered, our invention, as shown in FIG. 1, provides a composite construction material 10 comprising a novel form of backing material 11 having attached reinforcing horizontal line wires 12 and an outer layer of wire mesh 14. The composite material is nailed as a unitary structure to studs 13 with the wire mesh 14 held in place by removable tear tapes 15, 16, and 17. The sequential illustration of FIG. 3 shows the portion of construction material 10 illustrated in FIG. 1 with the tear tapes 15, 16, and 17 partially removed following the permanent attachment of the wire mesh 14 to the studs 13 by means of spacing or furring nails 19.

In compliance with the statute (35 U.S.C. 112) we shall now set forth the preferred form of our invention which has so far occurred to us, but with the understanding that the appended claims are not to be limited to this one embodiment.

To solve the problem of providing a rigid plastering surface, we employ a reinforced backing material 11 having an outer sheet 18 of relatively thick building paper to which are secured a plurality of reinforcing line wires 12 which are firmly held to the paper 18 in a novel manner which will be described below. The building paper 18 is of the asphalt-saturated type commonly used in frame-stucco construction which may be obtained in varying grades, the more expensive type having a special waterproof surface treatment.

The reinforcing line wires 12 are preferably placed generally parallel along the length of the paper 18 and fixed at a predetermined uniform distance apart. This spacing may be varied as desired to increase or decrease the overall strength of the backing paper, which may also be controlled by varying the characteristics of the wire used. We have found that a more or less standard spacing of 6 inches is adequate to provide a strong plastering surface. The wires 12 could be arranged other than parallel, if desired, as in a loose mesh fashion; however, a feature of this invention is the discovery that this is unnecessary, for the desired rigidity and strength can be achieved at considerably less expense by using the spaced parallel wires 12.

While the line wires 12 may be made of any standard form of mild steel construction wire, we have found that the best results are obtained by using wire of rectangular cross-section. This wire may be formed either by slitting cold rolled sheet stock of a desired thickness into strips of proper width, or by flattening wire of circular cross-section in a cold rolling process. The wire must have high strength and also have sufficient hardness to avoid stretching in order to remain taut after installation, in order to maintain the proper rigidity of a firm plastering surface. Wire equivalent to No. 18 W and M gauge has been found to be adequate and also meets standards of the uniform building code.

Figure 1A:
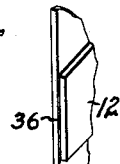

In manufacturing the preferred form of our composite backing paper 11, the wide side of each flat line wire 12 is attached directly to the building paper 18 by means of a suitable bonding material 36 (see FIG. 1A). We have discovered that the wires, when coated with a glue such as the well-known epoxy resin type and held firmly to the surface of the building paper 18, will bond with such strength that no slipping between wire and paper will occur, and the paper thus becomes well supported, maintaining its tension and rigidity when attached to the studs 13 as shown in FIGS. 1 and 3.

Under unusually severe conditions it may be necessary to reinforce the line wires 12 by means of backing strips 20 as shown in FIG. 7. The strips 20 are bonded by some suitable adhesive to both the wires 12a and the rear side of the building paper 18a with the strips 20 being formed tightly around the wires 12 to further insure that no slippage will occur between wires 12a and building paper 18a due to the pressure exerted in applying the stucco.

It would also be possible, of course, to use line wire 21 of circular cross-section, within the basic principles of the present invention (see FIG. 8). However, with round wire, greater care must be taken to secure the wires 21 to the building paper 18b so as to prevent slippage and subsequent sagging of the backing material 11. As shown in FIG. 8, a full sheet of kraft paper may be used as a backing liner 22 to form around the wires 21 and hold them firmly to the building paper 18b, and of course the full liner 22 could also be employed with the flat wire 12.

In nailing the backing paper 11 to the studs 13, it is desirable for workmen to know the exact location of the line wires 12 lying under the building paper 18. This problem is solved by providing strips or marking lines 37 which are printed on the outer surface of the building paper 18 directly over the wires 12, as shown in FIG. 1.

The wire mesh 14 on the surface of the backing paper 11, an important component of our novel composite building material 10, is used to form a gripping means for the stucco cement (not shown) as it is applied and, after drying, it serves as internal reinforcement for the stucco. One-inch mesh No. 18 wire is usually prescribed by the building code, and in the present invention the wire mesh 14 is attached in a unique and efficient manner to the backing material 11 by means of continuous removable tear strips or tapes 15, 16, and 17, which are arranged longitudinally along the upper, lower, and mid-portion of each section of composite material 10. In attaching the wire mesh 14 to the backing paper 11 as shown in FIG. 1, we prefer to bring the selvage edge 23 of the wire mesh 14 up even all along the upper edge 24 of the backing material 11. The upper tear tape 15 is placed over the wire mesh 14 along its upper selvage edge 23 and is bonded to the backing material 11 lying directly underneath, thus holding the mesh 14 firmly in position.

Along the lower edge of our composite material 10, the selvage edge 25 of the wire mesh 14 extends approximately two inches below the lower edge 26 of the backing material 11. The purpose of this extension of wire mesh 14 is to accommodate the overlapping of sections of material, which will be described later in greater detail.

The lower tear tape 16 also lies flat over the mesh 14 just above and along the lower edge 26 of the backing material 11, and is joined thereto by means of a suitable bonding material as used on the upper tape 15. A third tape 17 is arranged to pass approximately down the center of the section of composite material 10. The tear strips 15, 16, and 17 may be made from any suitable ribbon or tape material such as paper, cloth, or the like, and they may be attached by means of an adhesive or mastic backing to the building paper 18.

Under certain conditions, the tear tapes 15, 16, and 17 may adhere excessively to the surface of the building paper 18 and tend to peel off small portions as they are being removed to release the mesh 14. This result is undesirable, since it would ultimately destroy the waterproof integrity of the backing material 11. To solve this problem and insure against any removal of the waterproof backing material 11, we prefer to provide novel protective strips 28, 29, and 30 to the upper surface of the backing paper 11 (shown in detail in FIG. 6) covering the areas where tear tapes 15, 16, and 17 are to be placed as shown in FIGS. 1 and 3. The protective strips 28, 29, and 30 are attached to the building paper 18 with a greater bonding force than the tear tapes 15, 16, and 17 which lie on top and over the mesh 14, so that as the tear strips are removed any tearing due to excessive sticking will occur on the protective strips 28, 29, and 30 and not on the waterproof paper 18.

Another means of protecting the surface of the building paper 18 would be to paint a coating of protective material in lieu of the protective strips 28, 29 and 30 on the surface of the building material 18 which would harden and strengthen the local areas contacted by the tear tapes 15, 16, and 17.

To facilitate their removal, we may equip each tear tape with a rip string (not shown) embedded under the tape, having a loose end easily available to aid in removal of the tapes.

In FIG. 6 an enlarged view of the composite material according to the present invention is shown with the tear tapes passing conveniently over the single wires of the wire mesh 14. This arrangement enables the wire mesh 14 to be held firmly to the backing material 11 until the tapes are to be removed in installation.

Figures 2, 4:
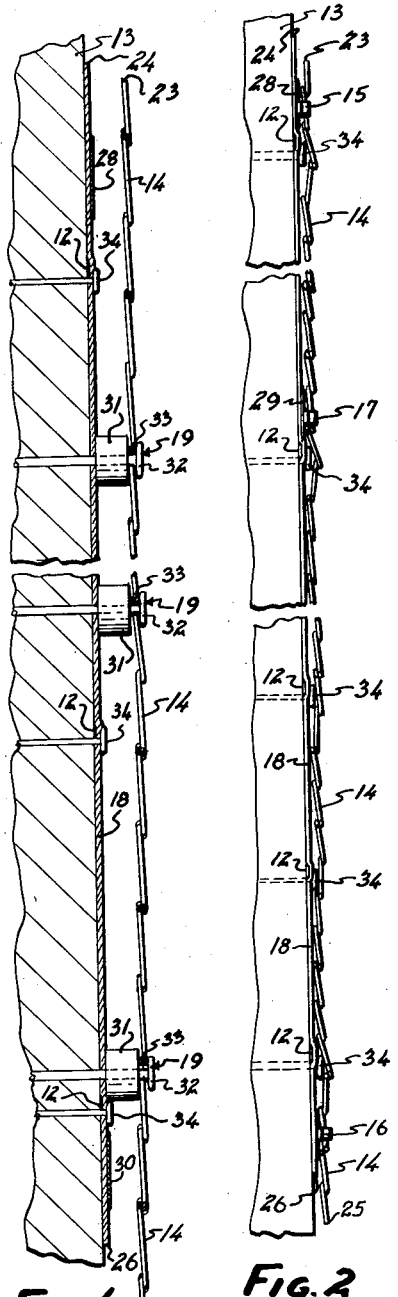
FIG. 2 is a fragmentary view in section taken along the line 2—2 in FIG. 1 showing both the upper and lower edges of the composite material. The thicknesses of the various layers have been exaggerated for purposes of clarity.
FIG. 4 is a fragmentary view in section taken along the line 4—4 of FIG. 3.

In use, the composite lath construction material 10 embodying the principles of the present invention is cut from a roll of stock into a section having the desired length and nailed directly to the bare studs 13 of a frame structure by roofing nails 34 or staples (as shown in FIG. 1 and FIG. 2). With the composite material 10 firmly attached, the wire mesh 14, having been held in position by the tear strips 15, 16 and 17, is now permanently attached to the studs 13 by use of standard furring nails 19 as shown in FIG. 3. The furring nails 19, shown in detail in FIG. 4, are well known in the art and have a shoulder 31 to engage the stud 13 to allow the nailhead 32 to be spaced outwardly, and a jaw means 33 on the head 32 to engage and retain a strand of the wire mesh 14 when the furring nail 19 is pounded in. With the wire mesh 14 now fixedly attached to the studding, the tear strips 15, 16 and 17 are easily grasped and quickly removed, as seen in FIG. 3, and additional furring nails may be added if desired.

Figure 5:
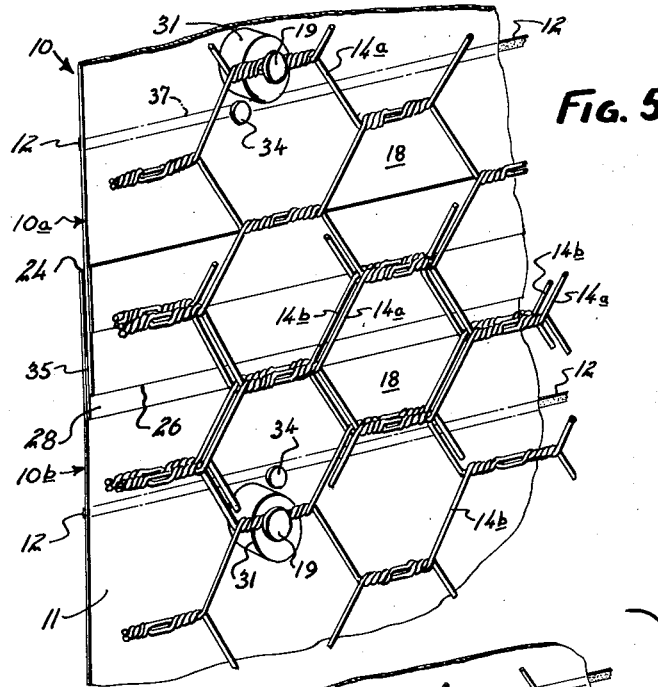
FIG. 5 is an enlarged fragmentary view in perspective showing in detail upper and lower overlapping sections of the composite material according to the present invention.

To cover a complete wall section using our invention, sections of the composite material 10 are cut from roll or sheet stock and attached thereto in the above manner, starting at the bottom of the wall. After a lower section is in place, another section is attached above it and spliced onto the lower section. As shown in FIG. 1, the lower selvage edge 25 of the wire mesh 14 extends approximately two inches below the lower edge 26 of the backing material 11. The reason for this excess mesh 14, as shown in FIG. 5, is now apparent in that an upper section 10a can properly overlap a lower section 10b when the composite material 10 is applied to the studding. This feature of our invention is important, since the overlapping of the backing material 11 from the top down stops any water from contacting the wall and running down and penetrating the joint 35 of sections 10a and 10b. In addition, the overlapping of the wire mesh 14a from the top section and 14b from the lower section, when covered with stucco, forms a strong continuously reinforced structural joint.

Thus, it may be seen that the present invention solves the problem of providing all of the essential components of a reinforced stucco lath material, in one efficient, unitary, composite form which not only greatly simplifies the installation of stucco walls but also assures strong, uniform construction. Our structure is both economical to manufacture and easy to apply, and it supplies a plastering surface which is absolutely free from slits or holes through which damaging moisture can pass. Compliance with building codes is assured by the built-in, prefabricated quality control, such as the spacing between line wires.

The complicated procedure heretofore required to prepare a wall for the application of stucco has been reduced to a few minor steps which require a minimum in time and skill. With the present composite material, the reinforcing line wires 12 remain constantly taut after installation and no tightening is required which could cause misalignment and deflection of stud frame members.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. An improved composite building material adapted for use in constructing stucco walls on the studding of a framed structure, said material comprising, in combination: a reinforced backing material including an upper impervious sheet; a plurality of line wires adjacent thereto, and means fixing said line wires to said upper sheet in a predetermined spaced relationship; a layer of wire mesh covering the upper surface of said backing material; detachable ribbon means extending across said wire mesh and holding it in a fixed position on said backing material; bonding means temporarily attaching said ribbon means to said backing material at intervals along its length, said bonding means being breakable by tension applied to the end of said ribbon means, said ribbon means being thereby removable after said building material has first been fixed to the studding so that said wire mesh material can be fixed permanently to the studding at a uniform distance from the backing material to provide a gripping means for the stucco.

2. An improved composite building material adapted for use in constructing stucco walls on the studding of a framed structure, said material comprising, in combination: a reinforced backing material having an upper sheet of paper, a lower sheet of paper bonded to said upper sheet, and a plurality of line wires fixed between said sheets in a substantially parallel and spaced apart relationship; a layer of wire mesh on the upper surface of said backing material; detachable ribbon means extending across said wire mesh and holding it in a fixed position on said backing material; bonding means temporarily attaching said ribbon means to said backing material at intervals along its length, said bonding means being breakable by tension applied to the end of said ribbon means, said ribbon means being thereby removable after said building material has first been fixed to the studding so that said wire mesh material can be fixed permanently to the studding at a uniform distance from the backing material to provide a gripping means for the stucco.

3. An improved composite building material adapted to be attached to the studding of a framed structure for use in constructing stucco walls, said material comprising, in combination: a reinforced backing material of constant width having a plurality of longitudinal line wires attached to the under side thereof at a fixed predetermined distance apart; a layer of wire mesh covering the upper side of said backing material, having its upper selvage edge substantially flush along the upper edge of said backing material and its lower selvage edge extending a predetermined distance below the lower edge of said backing material; and a removable tear tape means overlaying said wire mesh; bonding means on said tear tape means for temporarily attaching said removable tear tape means to said backing material at intervals along its length, said tape means running substantially parallel to said line wires and being thereby adapted to hold said wire mesh in a fixed position relative to said backing material, and being removable after said building material has first been secured to the studding, after which the wire mesh is attached permanently to the studding at a fixed distance from said backing material to provide a gripping means for the stucco.

4. An improved composite building material for use in constructing stucco walls on the studding of a framed structure, comprising: a reinforced paper backing material of constant width having a plurality of longitudinal line wires attached to the underside of said backing material at a fixed predetermined distance apart, and protective strips bonded to the upper side of said backing material along at least the upper and lower edges thereof; a layer of wire mesh covering the upper side of said backing material, having its upper selvage edge substantially flush along the upper edge of said backing material and its lower selvage edge extending a predetermined distance below the lower edge thereof; and tear tape means overlaying said wire mesh and holding it in a fixed position on said backing material; bonding means removably attaching said tape means to said upper and lower protective strips, said tape means running substantially parallel to said line wires and being thereby adapted to hold said wire mesh in a fixed position relative to said backing material when it is initially attached to the studding, and being thereafter removable so that the wire mesh can be attached permanently to the studding at a fixed distance from said backing material to provide a gripping means for the stucco.

5. The device as described in claim 4, wherein the bonding strength of the protective strips to said backing material is greater than the bonding strength of said tear tape means to said wire mesh and said protective strips, whereby any tearing of said backing material is eliminated when said tear tape means are removed.

6. The device as described in claim 5, including marking lines on the upper side of the paper backing material directly over the line wires, to thereby indicate the location of said line wires.

7. The device as described in claim 5, wherein said paper backing material comprises an upper layer of asphalt-impregnated building paper covering one side of said line wires and an inner liner of back-up paper bonded to the other side of said wires and to said upper layer of building paper to hold said wires in fixed position.

References Cited in the file of this patent

UNITED STATES PATENTS

| | | |
|---|---|---|
| 388,700 | Manahan | Aug. 28, 1888 |
| 464,792 | List | Dec. 8, 1891 |
| 706,874 | Alcan | Aug. 12, 1902 |
| 1,061,389 | Leist | May 13, 1913 |
| 1,358,283 | Brown | Nov. 9, 1920 |
| 1,360,812 | Stewart | Nov. 30, 1920 |
| 1,460,833 | Abraham | July 3, 1923 |
| 1,474,699 | Wisbrock | Nov. 20, 1923 |
| 1,605,283 | Robinson | Nov. 2, 1926 |
| 1,665,433 | Benedict | Apr. 10, 1928 |
| 1,972,639 | Bailey | Sept. 4, 1934 |
| 2,355,333 | Sandell | Aug. 8, 1944 |
| 2,561,781 | Bruce | July 24, 1951 |
| 2,638,430 | Mann | May 12, 1953 |
| 2,929,239 | Dahlauser et al. | Mar. 22, 1960 |